United States Patent
Yue et al.

(10) Patent No.: US 8,144,276 B2
(45) Date of Patent: Mar. 27, 2012

(54) LIQUID CRYSTAL OPTICAL DEVICE CONFIGURED TO REDUCE POLARIZATION DEPENDENT LOSS AND POLARIZATION MODE DISPERSION

(75) Inventors: Xuefeng Yue, San Jose, CA (US); Ruibo Wang, Oak Park, CA (US)

(73) Assignee: Oclaro (North America), Inc., San Jose, CA (US)

( * ) Notice: Subject to any disclaimer, the term of this patent is extended or adjusted under 35 U.S.C. 154(b) by 426 days.

(21) Appl. No.: 12/475,116

(22) Filed: May 29, 2009

(65) Prior Publication Data

US 2010/0302469 A1 Dec. 2, 2010

(51) Int. Cl.
*G02F 1/1335* (2006.01)
(52) U.S. Cl. ............. 349/18; 349/19; 349/33; 349/41; 349/56; 349/74
(58) Field of Classification Search ............ 349/1, 18, 349/19, 33, 41, 56, 74, 75
See application file for complete search history.

(56) References Cited

U.S. PATENT DOCUMENTS

| | | | |
|---|---|---|---|
| 6,307,677 B2 | 10/2001 | Cao | |
| 7,499,608 B1 | 3/2009 | Kelly et al. | |
| 7,574,073 B2 * | 8/2009 | Corem et al. | 385/11 |
| 7,822,303 B2 * | 10/2010 | Cohen et al. | 385/18 |
| 2001/0048556 A1 | 12/2001 | Ranalli et al. | |
| 2003/0026583 A1 | 2/2003 | Hoyt et al. | |

OTHER PUBLICATIONS

PCT International Search Report and Written Opinion dated Jul. 30, 2010, International Application No. PCT/US10/36681.

* cited by examiner

*Primary Examiner* — Jennifer Doan
(74) *Attorney, Agent, or Firm* — Patterson & Sheridan, L.L.P.

(57) ABSTRACT

An LC-based optical device compensates for differences in optical path lengths of polarization components of input beam. As a result, PDL and PMD of the optical device are reduced. The compensation mechanism may be a glass plate that is disposed in an optical path of a polarization component so that the optical path length of that polarization component can be made substantially equal to the optical path length of the other polarization component that traverses through a half-wave plate. Another compensation mechanism is a birefringent displacer that has two sections sandwiching a half-wave plate, wherein the two sections are of different widths and the planar front surface of the birefringent displacer can be positioned to be non-orthogonal with respect to the incident input light beam.

5 Claims, 5 Drawing Sheets

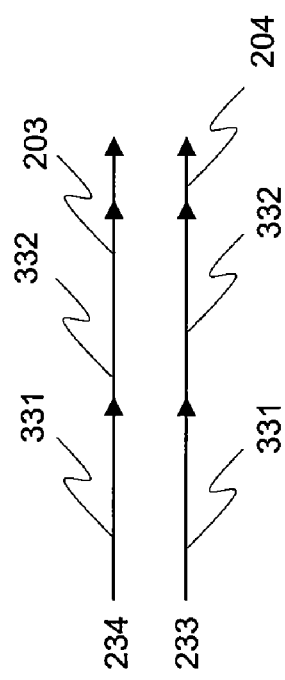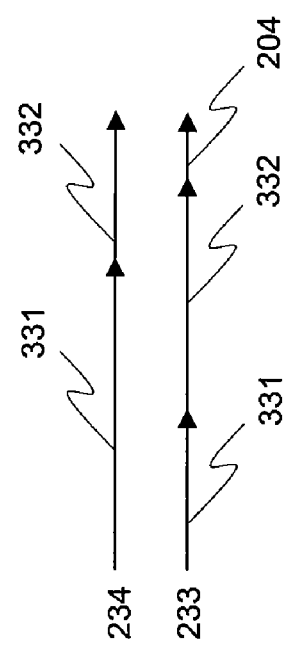
FIG. 4
FIG. 5

LIQUID CRYSTAL OPTICAL DEVICE CONFIGURED TO REDUCE POLARIZATION DEPENDENT LOSS AND POLARIZATION MODE DISPERSION

BACKGROUND OF THE INVENTION

1. Field of the Invention

Embodiments of the present invention relate generally to optical communication systems and components and, more particularly, to a liquid crystal-based optical device that is configured to reduce polarization dependent loss and polarization mode dispersion.

2. Description of the Related Art

In optical communication systems, it is sometimes necessary to perform 1×2 switching of an optical signal, where an input light beam enters an optical switching device through an input port and is directed to one of two output ports. There are also more complicated optical switching schemes, such as 2×2, 1×N, and N×N optical switches, which may be realized by combining multiple 1×2 optical switches.

In addition to routing of signals by optical switches, attenuation of signals in optical communication systems is needed, for example in an optical communication system that employs wavelength division multiplexing (WDM). In such an optical system, information is carried by multiple channels, each channel having a unique wavelength. WDM allows transmission of data from different sources over the same fiber optic link simultaneously, since each data source is assigned a dedicated channel. The result is an optical communication link with an aggregate bandwidth that increases with the number of wavelengths, or channels, incorporated into the WDM signal. In this way, WDM technology maximizes the use of an available fiber optic infrastructure, such that what would normally require multiple optic links or fibers instead requires only one. In practice, different wavelength channels of a WDM signal typically undergo asymmetrical losses as they travel through an optical communication system, resulting in unequal intensities for each channel. Because these unequal intensities can compromise the integrity of the information carried by the WDM signal, an optical device or array of optical devices is used in WDM systems to perform attenuation to equalize the respective intensities of the channels contained in a WDM signal.

Liquid crystal (LC) based optical switches are known in the art for switching and attenuation of the channels contained in a WDM signal. An LC-based optical switch relies on rotating the polarization state of linearly polarized input beam to perform switching and attenuation functions. The LC-based optical switch divides an input beam into s- and p-polarized components, and manages the switching and attenuation of each component separately. The division of the input beam into s- and p-polarized components produces two negative effects that need to be compensated. The first is polarization dependent loss (PDL). The s- and p-polarized components experience different losses as they pass through various elements of the LC-based optical switch. The second is polarization mode dispersion (PMD). PMD occurs because of random imperfections and asymmetries in the optical medium that is traversed by the s- and p-polarized components. For optimal performance of the LC-based optical switch, the PDL and the PMD need to be minimized.

SUMMARY OF THE INVENTION

One of keys in reducing PDL and PMD in an LC-based optical switch is to minimize the differences in the optical paths traversed by the s- and p-polarized components. One or more embodiments of the present invention provide an LC-based optical device that is configured to reduce PDL and PMD and a method for reducing PDL and PMD in an LC-based optical device.

An optical device according to an embodiment of the present invention includes a birefringent displacer for dividing an input beam into a first component and a second component, an LC structure for conditioning the polarization state of incident light and disposed in optical paths of the first and second components, a half-wave plate disposed in the optical path of the first component between the birefringent displacer and the LC structure, and a glass plate disposed in the optical path of the second component between the birefringent displacer and the LC structure.

An optical device according to another embodiment of the present invention includes a birefringent displacer for dividing an input beam into a first component and a second component, an LC structure for conditioning the polarization state of incident light and disposed in optical paths of the first and second components, and a half-wave plate disposed in the optical path of the first component between the birefringent displacer and the LC structure, wherein the birefringent displacer includes a first birefringent crystal and a second birefringent crystal and the first and second birefringent crystals have different thicknesses.

A wavelength selective switch according to an embodiment of the present invention includes a wavelength dispersive element for separating an input beam into its wavelength components, a birefringent displacer disposed in optical paths of the wavelength components, an LC structure for conditioning the polarization state of incident light and disposed in optical paths of the wavelength components, and a half-wave plate disposed between the birefringent displacer and the LC structure, wherein the birefringent displacer includes a first birefringent crystal and a second birefringent crystal and the first and second birefringent crystals have different thicknesses.

A method for compensating for PDL in an LC-based optical device having a birefringent displacer includes the steps of measuring the PDL of the input beam, rotating the birefringent displacer, and measuring the PDL of the input beam after rotation of the birefringent displacer. The steps of rotating and measuring may be carried out until the measured PDL is at a minimum. After the minimum PDL is found, the birefringent displacer is affixed to its mounting frame so that the angle formed by its front planar surface with respect to an optical path of the input beam can be maintained during operation.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 4 illustrates optical path lengths through a portion of the LC-based switching system of FIG. 2 with a glass plate.

FIG. 5 illustrates optical path lengths through a portion of the LC-based switching system of FIG. 3 without a glass plate.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
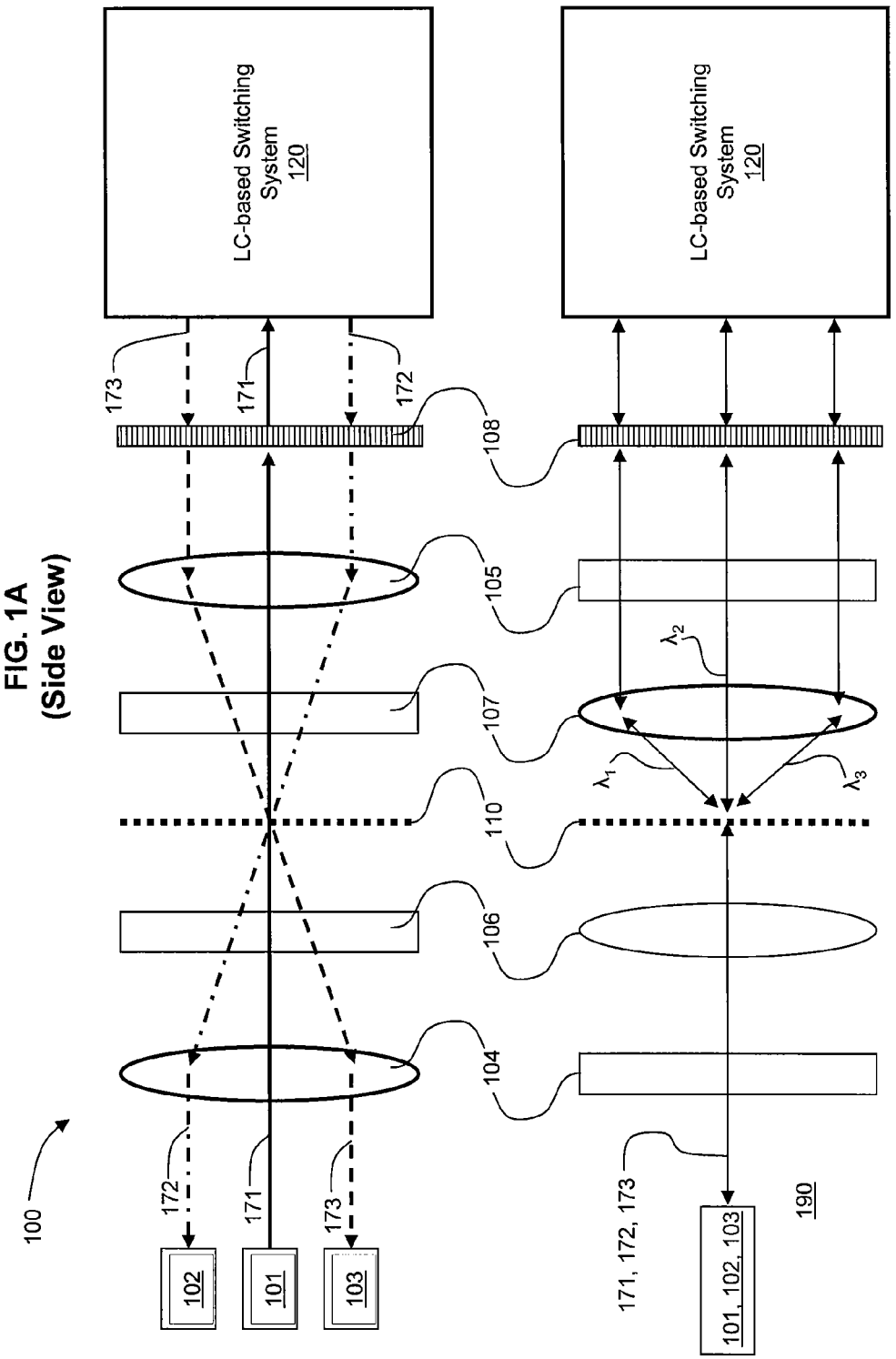
FIG. 1A is a schematic side view of a wavelength selective switch (WSS) that performs 1×2 switching and attenuation of a WDM signal, according to an embodiment of the invention
FIG. 1B is a schematic top view of a wavelength selective switch that performs 1×2 switching and attenuation of a WDM signal, according to an embodiment of the invention.

One or more embodiments of the present invention provide an LC-based optical device that is configured to reduce PDL and PMD and a method for reducing PDL and PMD in an LC-based optical device. The LC-based optical device may be a wavelength selective switch (WSS) and the present invention will be described below in the context of a WSS. However, the present invention is applicable to other types of LC-based optical devices, such as a reconfigurable optical add-drop multiplexer (ROADM).

FIG. 1A is a schematic side view of a WSS 100 that performs 1×2 switching and attenuation of a WDM signal, according to an embodiment of the invention. FIG. 1B is a schematic top view of WSS 100. WSS 100 can selectively direct each of the wavelength channels of an input light beam to one of two output optical paths. For example, an input light beam containing a plurality of wavelength channels enters through an input fiber and each of the individual wavelength channels may be directed to one of two output fibers. The terms "top view" and "side view" and references to the horizontal and vertical directions are for purposes of description only. One of skill in the art will recognize that WSS 100 may be configured in any orientation and perform 1×2 switching and attenuation as described herein.

As depicted in FIGS. 1A and 1B, WSS 100 includes an optical input port 101, optical output ports 102 and 103, beam shaping optics (as further detailed below), a diffraction grating 110, a quarter-wave plate 108 and an LC-based switching system 120. WSS 100 may also include additional optics, such as mirrors, focusing lenses, and other steering optics, which have been omitted from FIGS. 1A and 1B for clarity. The beam shaping optics include X-cylindrical lenses 104, 105 and Y-cylindrical lenses 106, 107. The components of WSS 100 are mounted on a planar surface 190 that is herein defined as the horizontal plane for purposes of this description. In the example described herein, planar surface 190 is substantially parallel to the plane traveled by light beams interacting with WSS 100. Also for purposes of description, the configuration of WSS 100 described herein performs wavelength separation of a WDM signal in the horizontal plane (i.e., as illustrated in FIG. 1B) and switching selection, i.e., channel routing, in the vertical plane (as illustrated in FIG. 1A).

Optical input port 101 optically directs a WDM optical input beam 171 to the WSS 100. Optical input beam 171 includes a plurality of multiplexed wavelength channels and has an arbitrary combination of s- and p-polarization. X-cylindrical lens 104 vertically extends inbound beam 171, and Y-cylindrical lens 106 horizontally extends inbound beam 171. Together, X-cylindrical lens 104 and Y-cylindrical lens 106 shape optical input beam 171 so that the beam is elliptical in cross-section when incident on diffraction grating 110, wherein the major axis of the ellipse is parallel with the horizontal plane. In addition, X-cylindrical lens 104 and Y-cylindrical lens 106 focus optical input signal 171 on diffraction grating 110.

Diffraction grating 110 is a vertically aligned diffraction grating configured to spatially separate, or demultiplex, each wavelength channel of optical input beam 171 by directing each wavelength along a unique optical path. In so doing, diffraction grating 110 forms a plurality of inbound wavelength beams, wherein the number of inbound wavelength beams corresponds to the number of optical wavelength channels contained in optical input beam 171. As shown in FIG. 1B, diffraction grating 110 is depicted separating optical input beam 171 into three input wavelength beams $\lambda_1$, $\lambda_2$, and $\lambda_3$. In practice, the number of wavelength channels contained in optical input beam 171 may be up to 50 or more. Because the separation of wavelength channels by diffraction grating 110 takes place horizontally in the configuration shown in FIG. 1B, spectral resolution is enhanced by widening inbound beam 171 in the horizontal plane, as performed by Y-cylindrical lens 106. Upon return of the wavelength beams from LC-based switching system 120, diffraction grating 110 also performs wavelength channel combination, referred to as multiplexing, as depicted in FIG. 1B. Together, X-cylindrical lens 105 and Y-cylindrical lens 107 columnate optical input signal 171 so that wavelength beams are normally incident upon entry into LC-based switching system 120. In addition, X-cylindrical lens 105 and Y-cylindrical lens 107 focus returning wavelength beams $\lambda_1$ and $\lambda_3$ on diffraction grating 110 after the beams exit LC-based switching system 120.

WSS 100 performs optical routing of a given wavelength channel by conditioning (via LC polarization) and vertically displacing the s- and p-components of a wavelength beam within LC-based switching system 120. Thus, output beam 172 exiting LC-based switching system 120, which is vertically displaced below input beam 171 into LC-based switching system 120, includes the wavelength channels selected for output port 102. Similarly, output beam 173 exiting LC-based switching system 120, which is vertically displaced above input beam 171 into LC-based switching system 120, includes the wavelength channels selected for output port 103. Attenuation may also be performed on each wavelength channel independently for input beam 171 in LC-based switching system 120, as discussed further below.

Figure 2:
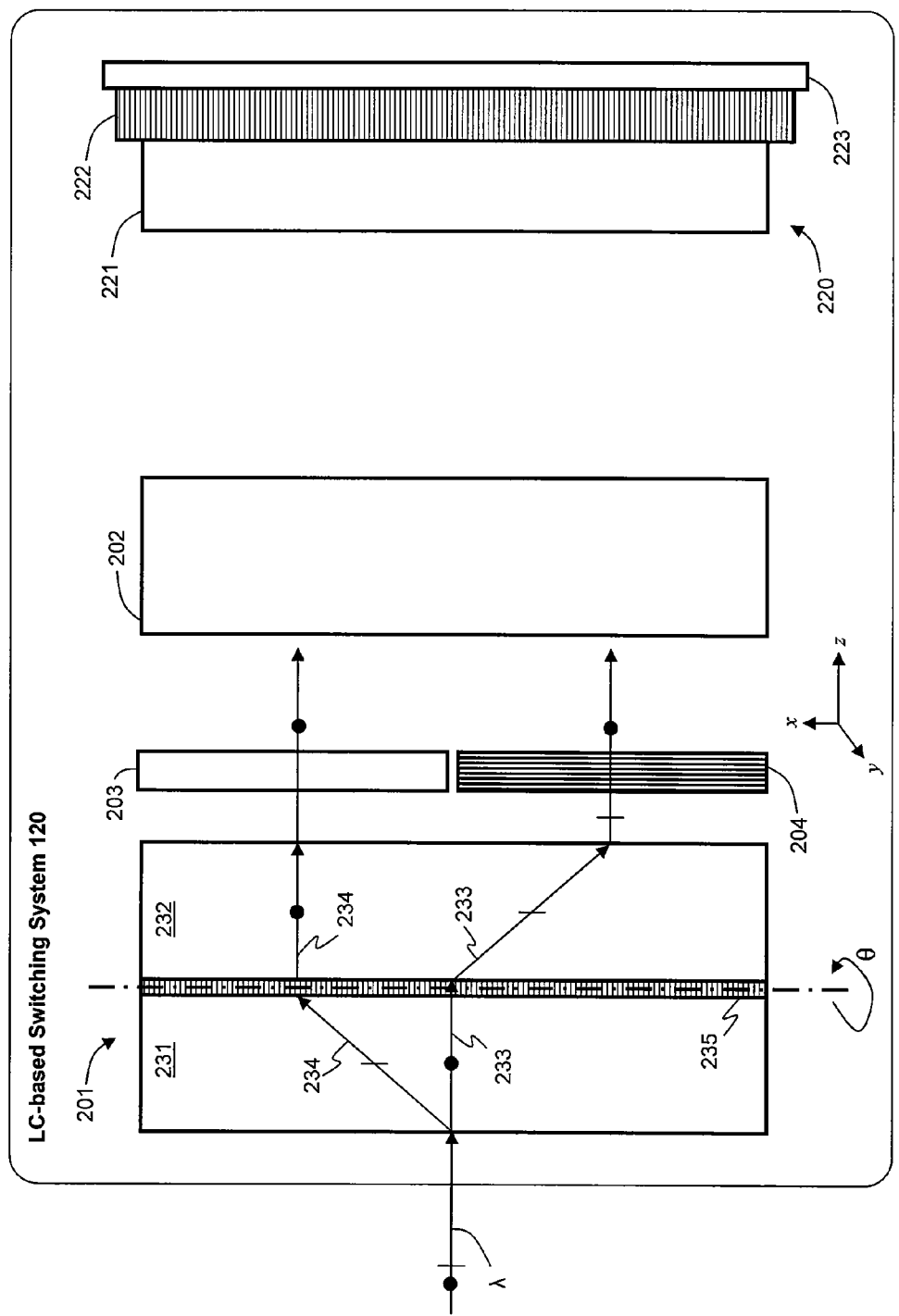
FIG. 2 is a schematic cross-sectional side view of one embodiment of an LC-based switching system that can be used in the WSS of FIG. 1.

FIG. 2 is a schematic cross-sectional side view of one embodiment of an LC-based switching system that can be used in the WSS of FIG. 1. LC-based switching system 120 separates an incoming wavelength beam into s- and p-polarized components and provides the capability to control the settings of an LC beam-polarizing structure in order to switch and attenuate the s- and p-components as desired. As illustrated in FIG. 2, p-polarized light is denoted by a vertical bar, and s-polarized light by a dot.

LC-based switching system 120 includes a birefringent displacer 201, a glass plate 203, a half-wave plate 204, an LC beam-polarizing structure 202 that has an array of LC pixels (not shown), and a polarization separating and rotating assembly 220. Glass plate 203 is positioned above half-wave plate 204. Birefringent displacer 201 separates incoming wavelength beams into s- and p-polarized components before the components are conditioned by LC beam-polarizing structure 202, and combines the separate s- and p-polarized components of output wavelength beams into their respective output wavelength beams. For clarity, the optical paths of the input beam components are not illustrated after they pass through glass plate 203 and half-wave plate 204.

Birefringent displacer 201 comprises a first birefringent crystal 231 and a second birefringent crystal 232. First birefringent crystal 231 and second birefringent crystal 232 may each be $YVO_4$ crystal or other birefringent material that translationally deflects incident light beams by different amounts based on orthogonal polarization states. First birefringent crystal 231 is oriented relative to wavelength beam λ so that light of one polarization state (s-polarization, in the embodiment illustrated in FIG. 2) passes through first birefringent crystal 231 without significant deflection and light of the opposite polarization state (p-polarization, in the embodiment illustrated in FIG. 2) passes through birefringent displacer 101 with the deflection shown. Second birefringent crystal 232 is oriented with an optical axis so that an opposite deflection scheme is realized for incident light relative to the deflection scheme of first birefringent crystal 231.

First birefringent crystal 231 and second birefringent crystal 232 have substantially the same thickness. This ensures that the optical path lengths for a wavelength beam's s- and p-polarized components are substantially equal as they pass through birefringent crystal 201. In addition, the thickness of glass plate 203 is chosen to ensure that the optical path length of a wavelength beam's component that passes through glass plate 203 is substantially equal to the optical path length of a wavelength beam's component that passes through half-wave plate 204. This can be done by making the thickness of glass plate 203 to be $Nw*d/Ng$, where Nw and Ng are refractive indices for half-wave plate 204 and glass plate 203, respectively, and d is the width of half-wave plate 204.

LC beam-polarizing structure 202 includes an array of LC subpixels that are formed between a plurality of row electrodes and a plurality of column electrodes. LC subpixels contain an LC material, such as twisted nematic (TN) mode material, electrically controlled birefringence (ECB) mode material, etc. The electrodes apply a potential difference across each of LC subpixels, and each LC subpixel conditions polarity of incident light based on this potential difference. The electrodes are transparent and may be patterned from indium-tin oxide (ITO) layers.

Polarization separating and rotating assembly 220 includes a birefringent element 221, a quarter-wave plate 222, and a mirror 223. In the embodiment of FIG. 2, birefringent element 221 is oriented with an optical axis so that its deflection scheme for incident light is similar to that of first birefringent crystal 231 (i.e., opposite to the deflection scheme of second birefringent crystal 232). That is, p-polarized components pass through birefringent displacer 221 with an upward deflection and s-polarized components pass through birefringent displacer 221 without significant deflection. Quarter-wave plate 222 is mounted on mirror 223, where mirror 223 reflects incident light, and quarter-wave plate 222 rotates the polarization of incident light a total of 90° when incident light passes through quarter-wave plate 222 twice. Alternatively, in lieu of mirror 223, other optical apparatus can be devised by one of skill in the art to redirect light that has passed through LC beam-polarizing structure 202 and quarter-wave plate 222 back toward LC beam-polarizing structure 202 and quarter-wave plate 222 for a second pass.

Figure 3:
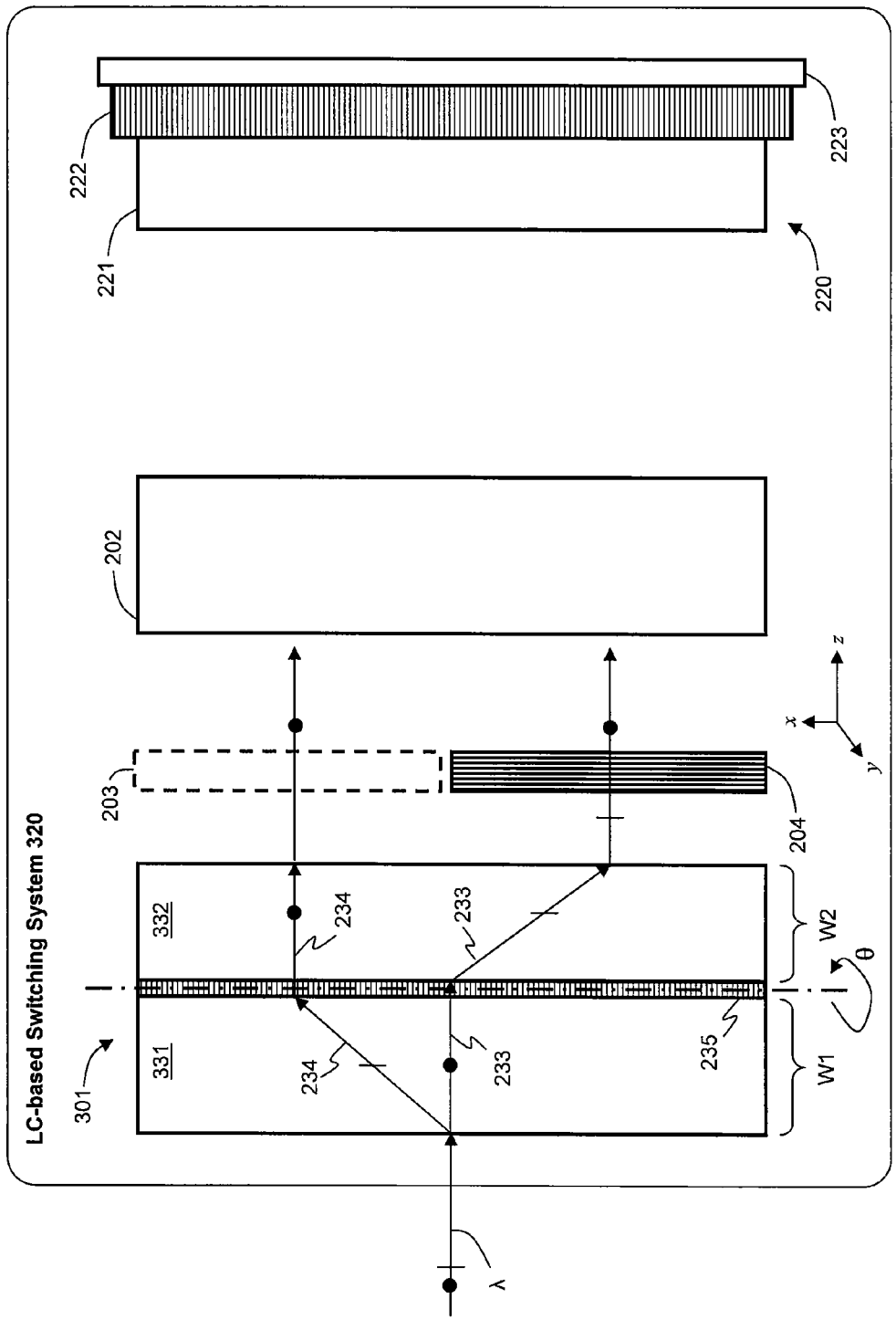
FIG. 3 is a schematic cross-sectional side view of another embodiment of an LC-based switching system that can be used in the WSS of FIG. 1.

FIG. 3 is a schematic cross-sectional side view of another embodiment of an LC-based switching system that can be used in the WSS of FIG. 1. LC-based switching system 320 can be used in place of LC-based switching system 120. LC-based switching system 320 is identical to LC-based switching system 120 except for birefringent displacer 301 and glass plate 203 may or may not be provided. Birefringent displacer 301 comprises first birefringent crystal 331 and second birefringent crystal 332 of differing widths. The width of first birefringent crystal 331, W1, is greater than the width of second birefringent crystal 332, W2. In one embodiment, the thicknesses differ by $(Nw-1)*d/(\Delta N)$, where Nw is the refractive index for half-wave plate 204; d is the width of half-wave plate 204; and $\Delta N$ is the birefringence of the crystal. In addition, the birefringent displacer 301 is rotated about the x axis with respect to the input beam. As a result of such rotation of birefringent displacer 301, the optical path lengths of beam component 233 and beam component 234 can be made substantially equal. Typically, the amount of rotation is 0 degrees to 9 degrees, so that the front planar face of birefringent displacer 301 forms an angle of 0 degrees to 9 degrees with respect to an imaginary plane that is orthogonal to the optical path of the input beam.

FIG. 4 illustrates optical path lengths of beam component 233 and beam component 234 in LC-based switching system 120. In this system, since the thicknesses of first birefringent crystal 231 and second birefringent crystal 232 are the same, any rotation of birefringent displacer 201 about the x-axis would not introduce any optical path length change for beam component 233 and beam component 234. As a result, the thickness of glass plate 203 must be precisely controlled so that there is minimal optical path length difference between the two beam components 233, 234. In addition, with this configuration, it is not possible to compensate for any optical path length difference caused by other components such as LC beam-polarizing structure 202.

FIG. 5 illustrates optical path lengths of beam component 233 and beam component 234 in LC-based switching system 320 that does not employ glass plate 203. It can be seen that the optical path length of beam component 234 is longer than the optical path length of beam component 233 through birefringent displacer 301, because W1 is greater than W2. However, when the optical path length of beam component 233 through half-wave plate 204 is added, the optical path length of beam component 234 becomes equal to the optical path length of beam component 233. In practice, it is difficult to perfectly control the thicknesses of first birefringent crystal 331 and second birefringent crystal 332 because of tolerance in manufacturing. As a result, it is difficult to make the optical path lengths of beam component 233 and beam component 234 to be the same. In addition, other components such as LC beam-polarizing structure 202, may affect the optical path lengths of beam component 233 and beam component 234 in different ways. To make the optical path lengths of beam component 233 and beam component 234 to be equal after first birefringent crystal 331 and second birefringent crystal 332 have been manufactured and birefringent displacer 301 has been assembled, birefringent displacer 301 is rotated about the x-axis by θ. The angle of rotation, θ, is adjusted manually until the optical path length of beam component 233 through birefringent displacer 301 and half-wave plate 204 and the optical path length of beam component 234 through birefringent displacer 301 become equal. After manual adjustment, an adhesive material, such as an epoxy, is applied to affix birefringent displacer 301 to a mounting frame so that the angle of rotation, θ, is maintained during operation of the WSS or any other optical device employing LC-based switching system 320.

Figure 6:
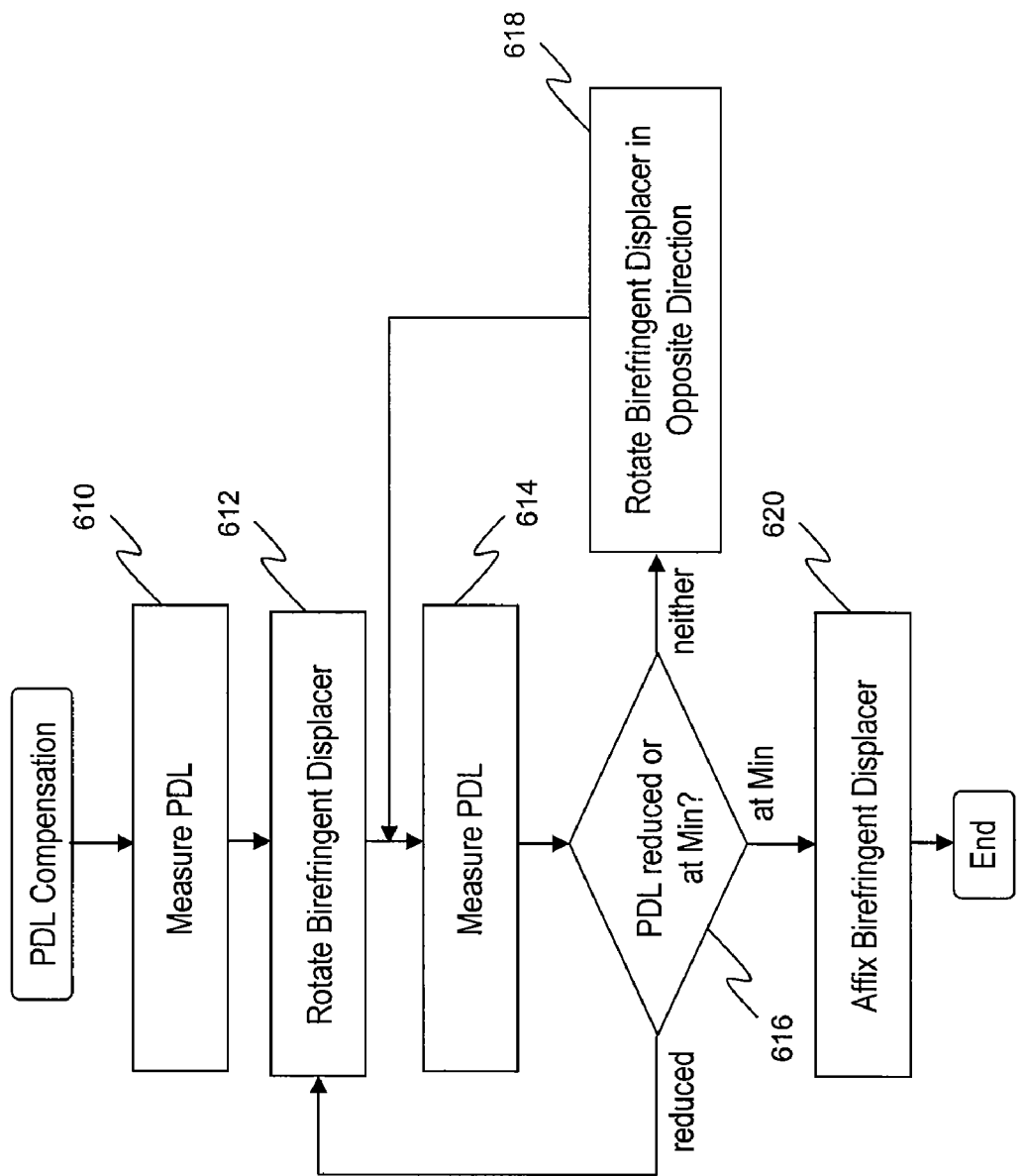
FIG. 6 is a flow diagram that illustrates the method for PDL compensation in an LC-based optical device.

FIG. 6 is a flow diagram that illustrates the method for compensating for PDL in an LC-based optical device having a birefringent displacer such as birefringent displacer 301 of FIG. 3. This method is described in the context of PDL compensation but can be adapted to PMD compensation by measuring PMD instead of PDL. In step 610, the PDL of the optical device is first measured. Then, the birefringent displacer is rotated about the x-axis in step 612. The PDL of the optical device is again measured in step 614. Based on the measurement in step 614, it is determined in step 616 if the PDL is reduced or at a minimum, or neither. If the PDL has been reduced, the method returns to step 612. If the PDL has not been reduced or is not at a minimum, the birefringent displacer is rotated about the x-axis in the opposite direction (step 618) and the method returns to step 614. If the PDL has reached a minimum, the birefringent displacer is affixed to its mounting frame (step 620) and the method ends.

While the foregoing is directed to embodiments of the present invention, other and further embodiments of the invention may be devised without departing from the basic scope thereof, and the scope thereof is determined by the claims that follow.

We claim:

1. A wavelength selective switch comprising:
    a wavelength dispersive element for separating an input beam into its wavelength components;
    a birefringent displacer disposed in optical paths of the wavelength components, the birefringent displacer including a first birefringent crystal and a second birefringent crystal, the first and second birefringent crystals having different thicknesses;
    a liquid crystal structure (LC) for conditioning the polarization state of incident light and disposed in optical paths of the wavelength components; and
    a half-wave plate disposed between the birefringent displacer and the LC structure.

2. The wavelength selective switch according to claim 1, further comprising a quarter-wave plate disposed between the wavelength dispersive element and the birefringent displacer.

3. The wavelength selective switch according to claim 2, wherein the birefringent displacer has a front face that is planar but not orthogonal with respect to the optical paths of the wavelength components.

4. The wavelength selective switch according to claim 1, wherein the first and second birefringent crystals have thicknesses that differ by $(N_w-1)*d/\Delta N$, where $N_w$ and $d$ are the refractive index and thickness of half-wave plate, respectively, $\Delta N$ is the birefringence of the first and second birefringent crystals.

5. The wavelength selective switch according to claim 1, wherein the birefringent displacer has a front face that is planar and forms an angle greater than 0 degrees and less than 9 degrees with respect to an imaginary plane that is orthogonal to the optical path of the optical paths of the wavelength components.

* * * * *